E. Y. WHITE.
MOTOR VEHICLE.
APPLICATION FILED JULY 1, 1908.
1,120,988.
Patented Dec. 15, 1914.
3 SHEETS—SHEET 1.
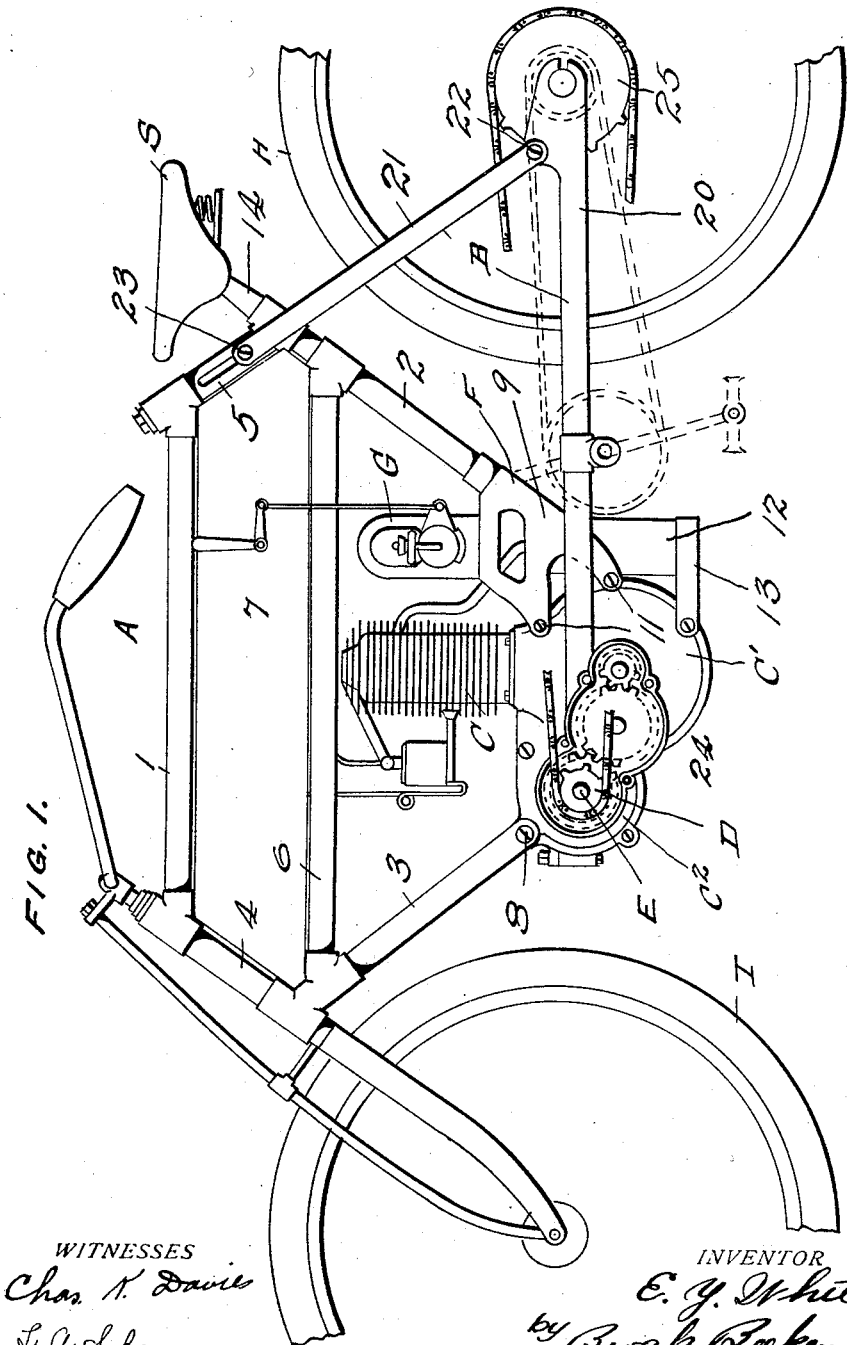
WITNESSES
Chas. K. Davis
L. A. Shannon
INVENTOR
E. Y. White
by Brock, Backer & Smith
Attorney E. Y. WHITE.
MOTOR VEHICLE.
APPLICATION FILED JULY 1, 1908.
1,120,988.
Patented Dec. 15, 1914.
3 SHEETS—SHEET 2.
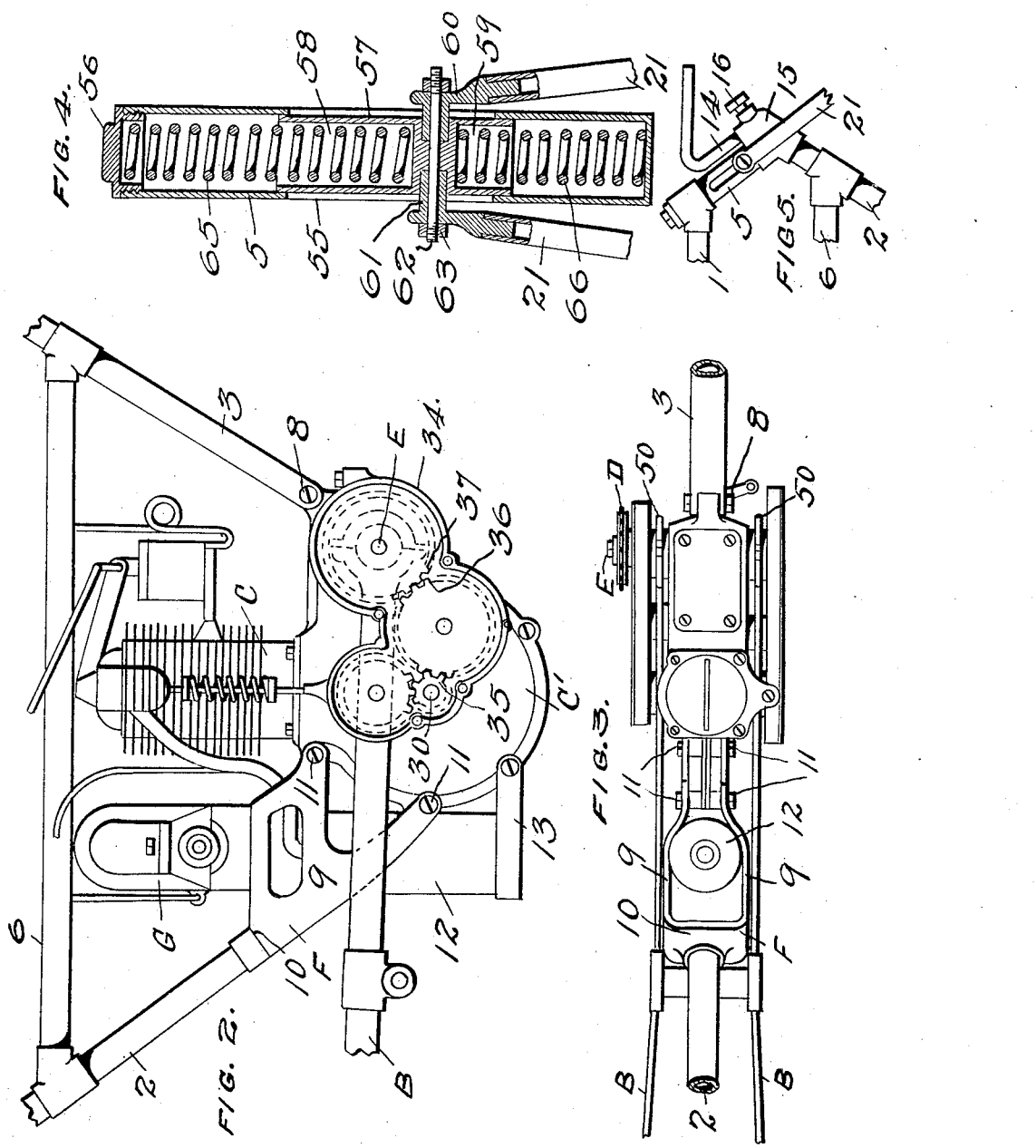
WITNESSES
Chas. K. Davis
L. A. Shannon
INVENTOR
E. Y. White
by Brock, Becker & Smith
Attorney E. Y. WHITE.
MOTOR VEHICLE.
APPLICATION FILED JULY 1, 1908.
1,120,988.
Patented Dec. 15, 1914.
3 SHEETS—SHEET 3.
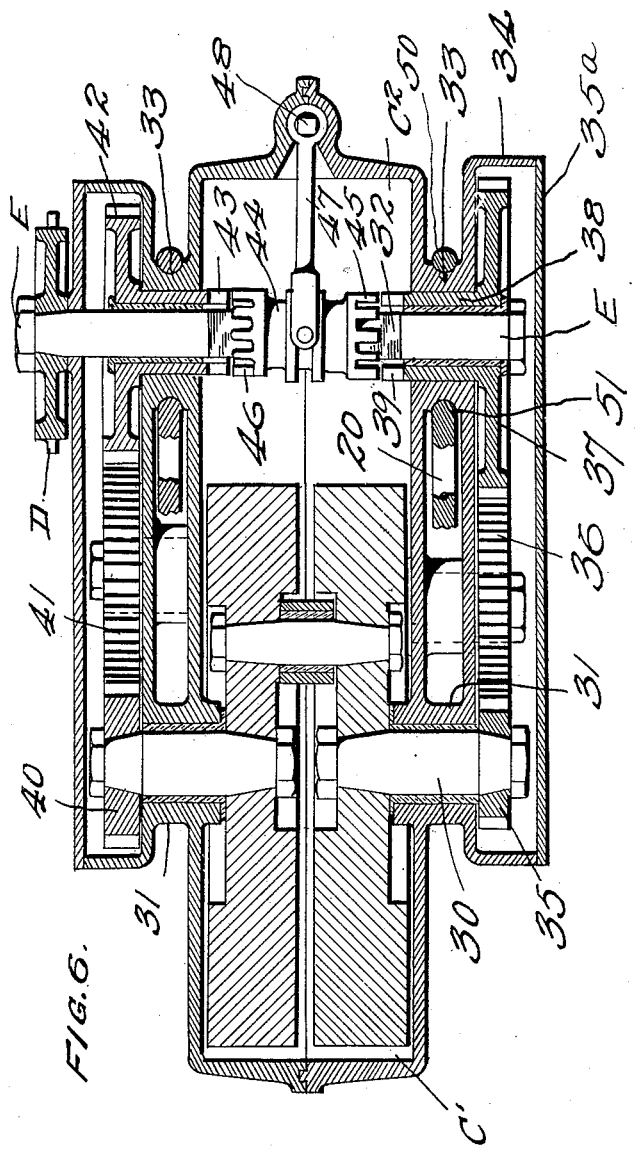
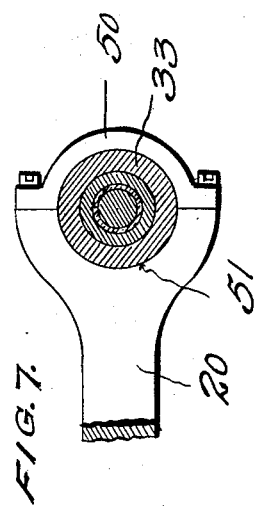
WITNESSES
Chas. K. Davies
E. L. Corbett.
INVENTOR
E. Y. White
by Brock Beckensmith
Attorney
THE NORRIS PETERS CO., PHOTO-LITHO., WASHINGTON, D. C.

UNITED STATES PATENT OFFICE.

EDWARD YOUNG WHITE, OF SAN ANTONIO, TEXAS.

MOTOR-VEHICLE.

1,120,988.  Specification of Letters Patent.  Patented Dec. 15, 1914.

Application filed July 1, 1908. Serial No. 441,358.

*To all whom it may concern:*

Be it known that I, EDWARD Y. WHITE, a citizen of the United States, and a resident of San Antonio, in the State of Texas, have invented certain new and useful Improvements in Motor-Vehicles, of which the following is a specification.

This invention has been designed with especial reference to use in motor bicycles, but some of its features may be used advantageously in other forms of motor vehicles.

Among the principal features of the invention are a rigid main frame carrying the motor and usually also carrying the saddle; a wheel frame carrying the driving wheel and pivoted to the main frame at the axis of the driving member; a driving member forward of the engine; change speed gearing intermediate the engine and driving member; means for permitting the engine to run free; a novel cushion or spring support for the wheel frame; and novel supporting means for the magneto.

These and other objects and advantages of the invention are hereinafter fully set forth in connection with a detailed description of the accompanying drawing, which shows an exemplification of the invention. It is to be understood that the invention is capable of embodiment in many different forms.

Figure 1 is a left side elevation of a motor cycle embodying the invention. Fig. 2 is a right side elevation of the central part of the machine. Fig. 3 is a top view of the central part of the machine; certain parts being removed. Fig. 4 is a longitudinal section through the spring head. Fig. 5 is a detail view of a modified form of support for the seat post. Fig. 6 is a section through the motor and change speed gearing on a plane intersecting the axes of the motor shaft and driving member, looking downward. Fig. 7 is a detail sectional view.

Reference character A designates the main frame. B indicates the wheel frame as a whole; the term "wheel frame" is intended to designate that portion of the frame carrying the driving wheel.

C is the motor having a casing $C^1$.

D is the driving member.

E is the axis of the driving member which constitutes the driving center.

F is the magneto bracket and G the magneto.

H is the rear wheel and I the front or steering wheel.

The main frame A may be variously constructed but a satisfactory form is shown in the drawing, comprising a top tube 1, rear tube 2, front tube 3, front head 4 connected to the top and front tubes, rear head 5 connected to the top and rear tubes and usually also a center tube 6 bridging the frame and connected with the front and rear tubes near the bottoms of the heads. The space between the top tube 1 and center tube 6 conveniently accommodates a tank or tanks 7. The motor casing $C^1$ is extended to form a gear casing $C^2$ and the power plant is conveniently secured to the frame by connecting the front and rear tubes to the casing. The front tube 3 is shown directly bolted to the casing at 8 and this method of connection may be used for the rear tube. In a preferred construction, however, the rear tube is connected to the motor through the magneto-bracket F. This bracket may be a sheet steel stamping, substantially of inverted U-shape in cross section, the seat members 9 being joined by a web 10 to the center of which the rear tube 2 may be connected as shown. The lower ends of the seat members are bolted to the casing at one or more points 11. The magneto G is secured in any suitable way to the top of the bracket and if desired the web 10 may be extended more or less along the top of the bracket for this purpose. The muffler 12 is conveniently accommodated within the bracket F and may be secured at its lower end by a brace 13 connected to the casing.

The saddle is conveniently carried by the usual saddle post 14 telescoping within the top of rear tube 2, which is left open for that purpose. Fig. 5 shows an alternative manner of mounting the saddle, consisting of a socket 15 arranged parallel to the rear head, in which the seat post 14, which in this case is of the reversed L type, is adjustably secured by a set screw 16.

The driving member D is exemplified by a small sprocket, which is impelled from the motor through gearing in a manner which will be hereinafter particularly described.

Means for yieldingly supporting the frame and its appurtenances upon the wheels so that the proper driving functions are undisturbed, will now be described: the front end of the frame is supported in the usual way by the steering wheel, the head 4 providing the steering pivot. The front wheel may be mounted on any suitable style of spring fork or rigid fork. The mounting of the rear end of the frame involves a more difficult problem since the driving connections must be accommodated. The wheel frame B carrying the driving wheel H is usually articulated and consists of braces 20, one on each side, to which the wheel axle is secured in the usual way, and fork 21. To rotate the wheel power must be applied to a member rotating about the wheel axis. This may be done by a belt or chain passing over a pulley or sprocket carried by the hub or by a bevel pinion engaging a bevel gear carried by the hub. Either method of drive demands, in order that best results may be attained, that the distance between the wheel axis and the driving center be constant under all conditions. This result has not been attained heretofore, to my knowledge, in a spring frame motor cycle. My invention provides the desired result, which can be realized with either form of drive, as will now appear.

The braces 20 are pivoted at their forward ends about the driving center E. The rear axle therefore moves in an arc, the center of which is the driving center and the proper driving distance is always maintained. Suitable means for pivoting the braces will later be more particularly described. The wheel frame includes also the fork 21, consisting as usual of two members. The lower ends of the fork are pivoted at 22 to the braces and the upper ends at 23 to a member movably mounted in the rear head and which is acted on by a yielding support, forming a cushion intermediate the driving wheel and the main frame. This mechanism will also be more particularly described.

As the vehicle in movement encounters variations in the road surface, the rear wheel is free to rise and fall in relation to the frame; the wheel axis, with braces 20, swinging about the driving center as a pivot, and the fork 21 turning on points 22 as a pivot and also reciprocating and turning on their pivot points 23 in relation to the rear head.

The chain drive is adopted for purposes of illustration. The chain 24 passes over small bracket D which constitutes the driving member and large sprocket 25 on the rear hub constituting the driven member which is impelled at a reduced speed. It will be evident that pulleys may be substituted for the sprockets and a belt for the chain. It will also be evident that the sprockets may be replaced by beveled gears and these gears connected through a shaft parallel with one of the braces, and beveled pinions.

In some cases, as for example when a single reduction from the motor to the driving wheel is sufficient, the driving center may be the axis of the motor crank shaft, and the driving member may be carried directly by that shaft. Frequently, however, another reduction is desirable between the motor and the wheel and this reduction is generally arranged to take place between the motor and the driving member. I provide this type of reduction gearing and the reduction gearing at the same time takes the form of change speed gearing, giving two or more variations in speed ratio between the motor and the wheel and also affording a means by which the motor may run free. This mechanism is best shown in Fig. 6. The crank shaft 30 is journaled in sleeves 31, which form extensions of casing C¹. The countershaft 32 is revolubly mounted in similar extensions 33 of casing C². These extensions 31 and 33 support a gear housing 34 provided with a removable cover plate 35ª, in which are inclosed the reduction gears. Countershaft 32 carries the driving member D which has been described, and axis E of the countershaft is in the present case the driving center. The crank shaft carries at one end a pinion 35, which impels, through an idler 36, a larger gear 37. The hub 38 of this gear revolves in one of the extensions 33 of the casing and one end of the countershaft 32 is in turn revolubly mounted within the gear hub 38. The hub is provided with jaws 39 forming one member of a clutch. At the other side the crank shaft carries another pinion 40, which drives through an idler 41 another gear 42, mounted in relation to the countershaft in a similar manner to gear 37. Pinion 40 and gear 42 are generally of different sizes from pinion 35 and gear 37, so that they give a different ratio of reduction.

The hub of gear 42 is provided with jaws 43 which form one member of a clutch. The central portion of the countershaft is squared and on this portion slides clutch member 44 provided at one end with jaws 45 adapted to engage jaws 32 on gear 37 and provided at the other end with jaws 46 adapted to engage jaws 43 on gear 42. Clutch member 44 is shifted by a fork 47 pivoted at 48 in the gear casing and other suitable mechanism intermediate the fork and the operator. The motor constantly impels both the gears 37 and 42. When clutch member 44 is in the position shown in Fig. 6, the gears revolve idly without effect on the movement of the vehicle, and the motor is free. By shifting the clutch to engage jaws 39 or 43 as desired, the driving wheel is impelled at different rates of speed in relation to that of the motor. The usual yielding or slip device may be interposed at any desired point in the power line to prevent damage by a too sudden connection of the motor or variations in speed thereof.

If it is not desired to provide two gear ratios, it is evident that one set of gears, for instance 40, 41, 42, may be dispensed with and the other set of gears serve simply as reduction gearing. In this case the clutch may or may not be employed, as desired.

The purpose of idle gears 36 and 41 is simply to enable the countershaft to be placed at a sufficient distance from the crank shaft to clear the revolving parts carried by the latter and at the same time to enable the size of the gears to be kept within reasonable limits. In certain cases, as for instance when the counter-weights are carried outside the motor casing, the countershaft gears may be made to engage directly with the pinions on the crank shaft.

The valve action of the motor may be impelled from one of the pinions 35 or 40 which serves for the drive of the vehicle and this arrangement is shown in Fig. 2.

The extensions 33 of the gear casing afford means for pivotally connecting the brace rods 20. The ends of the braces, as shown in Fig. 7, are enlarged to fit around extensions 33. In order to attach the braces they are made with removable caps 50. To insure the correct seating and alinement of the braces, the extensions 33 are conveniently semi-circularly grooved and the braces where they encircle the extensions are made of convex contour as at 51 to fit the grooves. The extensions 31 and 33, which carry housing 34, space the housing considerably away from the crank and gear casings, so that braces 20 have plenty of room to play up and down between the housing and the casing on each side thereof.

It remains to describe the particular cushion device employed to support the frame in relation to the vehicle. The rear head 5 is provided at each side with a slot 55. The bottom of the head is permanently closed and the top is closed by a screw cap 56. Within the head is a piston 57 similar to a trunk piston used in engines. The piston has two sockets, 58, 59, one opening toward one end of the tube and the other opening toward the other end. The side members of fork 21 are provided at their top ends with fittings 60 which terminate in trunnions 61, which pass through slots 55 and enter sockets formed in the piston. A bolt 62 and nuts 63 secure the fittings in position so that they may turn in the sockets. Between the piston and the upper end of the head is the supporting spring 65 and between the piston and the lower end of the head is the rebound spring 66. Evidently when the frame tends to drop in relation to the wheel, the fork 21 forces the piston upward in the head, compressing the spring 65. The reaction of the spring in restoring the parts to their normal position is taken up by spring 66 without perceptible shock.

I claim:

1. In a motor cycle, the combination of a rigid main frame, a motor thereon comprising a casing, a rotary driving member carried by said casing and having its axis transverse the frame, rear braces pivoted to said casing at the axis of the driving member, a driving wheel carried between said braces, a rear fork pivoted to the braces and yieldingly connected to the rigid frame and driving connections between the driving member and the wheel.

2. In a motor cycle, the combination of a rigid main frame, a motor thereon comprising a casing, a rotary driving member carried by the casing forward of the motor shaft and with its axis transverse the frame, driving means between the motor and the driving member, rear braces pivoted to the casing at the axis of the driving member, a driving wheel carried between the braces, a fork pivoted to the braces, a yielding connection between the fork and the rigid frame, and driving connections between the driving member and the wheel.

3. In a motor cycle, the combination of a rigid main frame, a motor therein comprising a casing, a driving member carried by the casing with its axis transverse the motor cycle, a lower rear fork consisting of two members and pivoted at their forward ends to the casing at the axis of the driving member, an axle secured in the rear ends of the fork members, a driving wheel on the axle between the fork members, an upper rear fork pivoted to the lower rear fork members near their rear ends, and a cushion device between the upper rear fork and the rigid frame.

4. In a motor cycle, the combination of a driving wheel, a steering wheel, a main frame therebetween, a casing secured in the lower part of the frame, a motor cylinder mounted on the casing, a motor shaft in the casing connected with the motor piston, change speed gearing in the casing connected with said shaft, a driving member of said gearing exterior to said casing, rear braces carrying the driving wheel and pivoted at their forward ends on the rotative axis of said driving member, rear forks yieldingly connected to the frame, and a driving connection between the said driving member and the driving wheel.

EDWARD YOUNG WHITE.

Witnesses:
JULIUS HENRY WURTZ,
ARTHUR THOMSON.